United States Patent [19]
Gilbertson

[11] 3,812,263
[45] May 21, 1974

[54] SYNERGISTIC COMPOSITIONS OF PHARMACEUTICALLY ACTIVE SUBSTANCES

[75] Inventor: Gilbert Gilbertson, Cresskill, N.J.

[73] Assignee: Foritzsche Dodge & Olcott Inc., New York, N.Y.

[22] Filed: Jan. 31, 1972

[21] Appl. No.: 222,283

[52] U.S. Cl.............................. 424/282, 424/300
[51] Int. Cl............................................ A61k 27/00
[58] Field of Search........................... 424/300, 282

[56] References Cited
UNITED STATES PATENTS
2,724,720    11/1955    Berger et al................... 424/300
3,637,753    1/1972    Kulka............................... 424/300

*Primary Examiner*—Albert T. Meyers
*Assistant Examiner*—Norman A. Drezin
*Attorney, Agent, or Firm*—Frank M. Nolan, Esq.

[57] ABSTRACT

Mixtures of certain 2,2-disubstituted-1,3-propanediol-dicarbamates, such as meprobamate, and certain 1-substituted-2,2-dialkyl-1,3-propanediol monocarbamates produce a narcosis effect when administered to mammals. A greater narcosis would be obtained by such a mixture than that expected by the sum of the effects of each component of such mixture.

3 Claims, No Drawings

SYNERGISTIC COMPOSITIONS OF PHARMACEUTICALLY ACTIVE SUBSTANCES

This invention relates to compositions comprising mixtures of certain monocarbamates and dicarbamates which are significantly superior in pharmacological properties to additive effects manifested by the components of the mixture.

The compositions of this invention comprise a mixture of 10 to 99 percent, desirably 30 to 97 percent and preferably 50 to 95 percent by weight of the dicarbamate and 1 to 90 percent, desirably 3 to 70 percent and preferably 5 to 50 percent by weight of the monocarbamate. The dicarbamate is 2-methyl-2-propyl-1,3-propanediol dicarbamate, 2-methyl-2-isopropyl-1,3-propanediol dicarbamate, 2-ethyl-2-phenyl-1,3-propanediol dicarbamate or mixtures of two or three of these dicarbamates. The monocarbamate and its n-phenyl and n-lower alkyl derivatives are of a glycol having the formula:

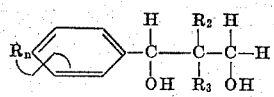

in which $n$ is 1 when $R_n$ is hydrogen, alkyl having less than six carbon atoms, hydroxy, alkoxy having less than six carbon atoms, or monochloro, $n$ is 2 when $R_n$ is 3,4-methylenedioxy, dichloro or phenylene fused to the phenyl ring to form naphthyl, $n$ is 3 when $R_n$ is trichloro, and $R_2$ and $R_3$ are alkyl in which the total number of carbon atoms is at least two and less than eight, wherein lower alkyl has not more than five carbon atoms. The monocarbamate portion of the mixture may be one or more different monocarbamates including mixtures of isomeric monocarbamates such as a mixture of 1-(3,4-methylenedioxyphenyl)-2,2-dimethyl-1-hydroxypropane-3-carbamate and 1-(3,4-methylenedioxyphenyl)-2,2-dimethyl-3-hydroxypropane-1-carbamate.

The compositions of this invention possess anticonvulsant properties. The compositions of this invention are especially effective for sedation.

Although an equal dosage of the monocarbamates manifests a deeper narcosis effect in mammals than an equal dosage of the dicarbamates, compositions of this invention of the same dosage comprising a mixture of dicarbamates and monocarbamates would produce a narcosis effect greater than that which would be effected by the monocarbamate alone. The compositions of this invention containing the mixture of dicarbamates and monocarbamates would effect a significantly greater narcosis than that expected by the additive effects of the components of the mixture.

The mixtures of the dicarbamates and monocarbamates of this invention may be administered to a mammal in any convenient dosage unit form such as tablets, capsules, solutions, suppositories, powders or suspensions produced by conventional techniques.

The carbamates employed as a component of the compositions of this invention may be produced as described in U.S. Pat. No. 2,724,720 granted on Nov. 22, 1955 to the assignors of F. M. Berger et al. The monocarbamates of this invention may be produced as described in U.S. Pat. No. 3,637,735 granted on Jan. 25, 1972 to the assignee of Kurt Kulka.

A more comprehensive understanding of this invention may be obtained by reference to the following examples:

EXAMPLE I 5 g of 2-methyl-2-propyl-1,3-propanediol dicarbamate is placed into a mortar together with 5 g of 1-(3,4-methylenedioxy-phenyl)-2,2-dimethyl-1-hydroxypropane-3-carbamate and ground carefully with a pestle to a uniform mixed powder. The resulting mixture may then be placed in gelatine capsules in such quantity as to produce a predetermined dosage unit form. The mixture may also be made into tablets by conventional methods.

For example, as a dosage for a guinea pig having a body weight of 631 g, 252 mg of the mixture are placed into a capsule to result in a dosage unit form of 0.4 g/kg of body weight. To produce a dosage unit of 0.8 g/kg, 554 mg of the mixture are placed into a capsule which may then be force fed to a guinea pig weighing 706 g.

EXAMPLE II 9 g of 2-methyl-2-propyl-1,3-propanediol carbamate is placed in a mortar and to it is added 1 g of 1-(3,4-methylenedioxy-phenyl)-2,2-dimethyl-1-hydroxypropane-3-carbamate. The two substances are then ground carefully with a pestle until the uniform mixture is assured. A dosage unit form is prepared in the form of capsules, suppositories or other desired dosage unit form for the mammal for which it is designed.

Instead of the 1-(3,4-methylenedioxyphenyl)-2,2-dimethyl-1-hydroxypropane-3-carbamate, the isomer 1-(3,4-methylenedioxyphenyl)-2,2-dimethyl-3-hydroxypropane-1-carbamate may be employed.

EXAMPLE III

Instead of the 2-methyl-2-propyl-1,3-propanediol dicarbamate used in Example I, 5 g of 2-methyl-2-isopropyl-1,3-propanediol dicarbamate and instead of 5 g of 1-(3,4-methylenedioxyphenyl)-2,2-dimethyl-1-hydroxypropane-3-carbamate as employed in Example I, 5 g of 1-(4-chlorophenyl)-2,2-dimethyl-1-hydroxypropane-3-carbamate is employed. The procedure outlined in Example I is otherwise followed.

EXAMPLE IV

Instead of the 5 g of 2-methyl-2-propyl-1,3-propanediol-dicarbamate employed in Example II, 5 g of 2-ethyl-2-phenyl-1,3-propanediol dicarbamate is employed and instead of the 5 g of 1-(3,4-methylenedioxyphenyl)-2,2-dimethyl-1-hydroxypropane-3-carbamate 5 g of 1-(4-chlorophenyl)-2-methyl-2-propyl-3-hydroxypropane-1-carbamate is employed.

If it is desired to produce combinations of other monocarbamates, such other monocarbamates may be substituted for those specified in Examples I or II. For instance, the following monocarbamates may be substituted for the monocarbamates specified in any of the examples heretofore described:

1-(4-methoxyphenyl)-2,2-dimethyl-1-hydroxypropane-3-carbamate
1-phenyl-2,2-dimethyl-1-hydroxypropane-3-carbamate 1-(4-isopropylphenyl)-2,2-dimethyl-3-hydroxypropane-1-carbamate
1-(4-methylphenyl)-2,2-dimethyl-1-hydroxypropane-3-carbamate
1-(naphthyl)-2,2-dimethyl-1-hydroxypropane-3-carbamate
1-(4-chlorophenyl)-2,2-dimethyl-1-hydroxypropane-3-n-methyl-carbamate
1-(3,4-methylenedioxyphenyl)-2,2-dimethyl-1-hydroxypropane-3-n-phenyl-carbamate

What is claimed is:

1. A composition for effecting narcosis when administered to mammals comprising 2-methyl-2-propyl-1,3-propandiol dicarbamate and 1-(3,4-methylenedioxyphenyl)-2,2-dimethyl-1,3-dihydroxy propane monocarbamate in the ratio of one to nine parts by weight of the dicarbamate to one part by weight of the monocarbamate.

2. The composition of claim 1 wherein the ratio is one part by weight of the dicarbamate to one part by weight of the monocarbamate.

3. The composition of claim 1 wherein the ratio is nine parts by weight of the dicarbamate to one part by weight of the monocarbamate.

* * * * *